3,516,940
EUROPIUM ACTIVATED BaO·MgO·P₂O₅
PHOSPHORS
Costas C. Lagos, Danvers, Mass., assignor to Sylvania
 Electric Products Inc., a corporation of Delaware
No Drawing. Filed Dec. 15, 1967, Ser. No. 690,739
Int. Cl. C09k 1/36
U.S. Cl. 252—301.4                9 Claims

ABSTRACT OF THE DISCLOSURE

Divalent europium is used as an activator in $$BaO \cdot MgO \cdot P_2O_5$$

phosphors. In the preferred phosphor compositions, the ratio of Ba atoms to Mg atoms can vary from about 2:1 to 1:2 and the ratio of Ba and Mg atoms to P atoms from about 3:2 to 3:4. Under ultraviolet excitation, the emission of phosphors within the range of the preferred compositions can vary from purple through blue to yellow. Activation by manganese and divalent europium produces an additional emission band in the red region of the spectrum.

BACKGROUND OF THE INVENTION

Field of the invention

This invention relates to phosphors of the type used in arc discharge lamps.

Description of the prior art

Phosphors commonly used with arc discharge lamps, such as fluorescent and high pressure mercury vapor (HPMV) lamps, include pyrophosphates activated by tin, halophosphates activated by antimony, and tungstates activated by lead. Such phosphors are selected for high efficiency in converting electrical power to visible radiation or for a particular spectral radiation. For example, when white light is desired, two or more phosphors may be combined, the spectral output of which balances into white light. In some applications, the preferred radiation is at a particular wavelength; for example, in certain photocopying processes, blue emitting lamps are desirable. An efficient phosphor, then, can be utilized in arc discharge lamps for either of these reasons.

In a co-pending application, Ser. No. 669,381, entitled "Fluorescent Phosphors And Screen," filed on Sept. 20, 1967 by Toma et al. and assigned to the instant assignee, a europium activated barium orthophosphate phosphor is disclosed. The phosphor is useful in X-ray intensifying screens and under X-ray excitation has a highly efficient narrow band emission in the blue region of the spectrum.

However, the instant invention is concerned with an ultraviolet excitable phosphor involving a ternary system, the metallic elements of which include barium and magnesium. The phosphate matrix can be an orthophosphate, pyrophosphate and/or tetraphosphate.

SUMMARY OF THE INVENTION

According to the present invention, we have discovered that $BaO \cdot MgO \cdot P_2O_5$ compounds within specific composition limits can be activated by divalent europium or manganese and divalent europium to provide new and useful ultraviolet excitable phosphors. The ratio of Ba atoms to Mg atoms can vary from about 2:1 to 1:2 and the ratio of Ba and Mg atoms to P atoms can vary from about 3:2 to 3:4. Outside these preferred limits, the efficiency of the phosphor is generally too low for use in arc discharge lamps.

The europium concentration can vary from about 0.0004 to 0.4 mole percent. Below about 0.0004 mole percent, there is usually insufficient activation to yield a useful phosphor. Above 0.4 mole percent, the cost of the europium is economically prohibitive for the applications mentioned above, although the efficiency of the phosphor is generally not impaired.

Phosphors activated by divalent europium within the limits of this invention emit in the spectral range from yellow through blue to violet. Table I, below, illustrates the fluorescent characteristics at 2537 A. excitation of barium and magnesium orthophosphates, pyrophosphates and tetraphosphates within the scope of this invention. The peak height in column 4 is expressed as a percentage of the peak height of a zinc orthosilicate phosphor standard.

TABLE I

| Phosphor | Peak emission, nm. | Width at half peak height, nm. | Peak height, percent | Emission color |
|---|---|---|---|---|
| $Ba_2Mg(PO_4)_2:Eu^{2+}$ | 585 | 148 | 8.5 | Light yellow. |
| $BaMg_2(PO_4)_2:Eu^{2+}$ | 418 | 77 | 24.5 | Blue. |
| $Ba_2MgP_4O_{13}:Eu^{2+}$ | 403 | 28 | 59.0 | Purple. |
| $BaMgP_2O_7:Eu^{2+}$ | 402 | 45 | 103.0 | Do. |

Table I shows that the emission of phosphors within the invention can be widely shifted by relatively small variations in the composition. For example $$Ba_2Mg(PO_4)_2:Eu^{2+}$$

produces peak emission at 585 nm., in the yellow region, and has a peak height of only 8:5% of that of the standard. However, because of the unusually broad emission band, 148 nm. at half peak height, the phosphor actually appeared brighter, under visual observation, than the zinc orthosilicate standard.

When the $P_2O_5$ concentration was doubled, yielding the $Ba_2MgP_4O_{13}:Eu^{2+}$ phosphor, the peak emission shifted to 403 nm., in the purple region, and the peak height increased to 59%. However, the band width narrowed to 28 nm., considerably less than the yellow emitting phosphor.

The measurements shown in Table I were all obtained at 2537 A. excitation, which is commonly obtained from a fluorescent lamp. However at 3650 A. excitation, such as is obtained from a HPMV lamp, the intensity of emission was greater for all the phosphors, although the band width and frequency of the peak were relatively unchanged.

Manganese, alone, will not efficiently activate $$BaO \cdot MgO \cdot P_2O_5$$

compounds to fluorescence. However, when divalent manganese and divalent europium are used together as activators, useful emission is obtained from the phosphors, with an emission band in the purple region and one in the red region. It is believed that an energy transfer occurs, from the europium to the manganese, to yield the emission band in the red region.

A $BaMgP_2O_7:Eu^{2+}_{0.03}:Mn^{2+}_{0.08}$ phosphor, excited at 2537 A., yielded an emission band at 404 nanometer in the purple region, and another band at 618 nanometers, in the red region. The peak height of the red band was about 45% higher than the purple band and the visual appearance of the fluorescent radiation was between pink and red.

However, by varying the relative concentrations of the divalent europium and divalent manganese activators, the ratio of the peak heights of the purple and red bands can be changed to vary the visible fluorescent radiation between red and purple. The concentration of the manganese activator can vary between about 0.0004 and 2.0 mole percent.

DESCRIPTION OF THE PREFERRED EMBODIMENTS

The following specific examples are offered as illustrations of preferred methods of preparing the phosphors and are not intended to be limitations upon the claims.

EXAMPLE I $Ba_2Mg(PO_4)_2:Eu^{2+}$

|  | Mole ratio | Grams |
|---|---|---|
| $BaHPO_4$ | 1.94 | 31.6 |
| $3MgCO_3 \cdot Mg(OH)_2 \cdot 3H_2O$ | 0.25 | 6.4 |
| $(NH_4)_2HPO_4$ | 0.06 | 0.555 |
| $Eu_2O_3$ | 0.03 | 0.74 |

The raw materials were dry mixed in a mixer mill for 20 minutes to produce a lump-free uniform blend. The blend was fired for 3 hours at 700° C. in a stagnant air atmosphere and then thoroughly ground into powder form with a mortar and pestle. The powder was next fired at 1100° C. for 2 hours in a slightly reducing atmosphere of 1% $H_2$—99% $N_2$ flowing at 10 cubic feet per hour over the powder. To prevent re-oxidation of the $Eu^{2+}$ to $Eu^{3+}$, the powder was cooled in the same reducing atmosphere. The $Ba_2Mg(PO_4)_2:Eu^{2+}$ phosphor composition was combined by X-ray diffraction, the pattern of which was as follows:

| d | I/I₁ | d | I/I₁ |
|---|---|---|---|
| 4.50 | 25 | 2.88 | 9 |
| 4.37 | 23 | 2.75 | 31 |
| 4.23 | 8 | 2.64 | 37 |
| 4.02 | 17 | 2.53 | 25 |
| 3.46 | 73 | 2.17 | 17 |
| 3.40 | 44 | 2.09 | 17 |
| 3.30 | 17 | 2.04 | 17 |
| 3.11 | 100 | 2.01 | 12 |
| 3.02 | 19 | 1.97 | 40 |
| 2.97 | 21 | | |

EXAMPLE II $BaMg_2(PO_4)_2:Eu^{2+}$

|  | Mole ratio | Grams |
|---|---|---|
| $BaHPO_4$ | 0.94 | 15.3 |
| $3MgCO_3 \cdot Mg(OH)_2 \cdot 3H_2O$ | 0.50 | 12.8 |
| $(NH_4)_2HPO_4$ | 1.06 | 9.8 |
| $Eu_2O_3$ | 0.03 | 0.74 |

The process was the same as that of Example I with the exception that the second firing was at 1200° C. The X-ray diffraction pattern was as follows:

| d | I/I₁ | d | I/I₁ |
|---|---|---|---|
| 4.00 | 52 | 2.63 | 4 |
| 3.93 | 69 | 2.57 | 50 |
| 3.86 | 100 | 2.35 | 14 |
| 3.09 | 33 | 2.29 | 10 |
| 3.06 | 27 | 2.24 | 21 |
| 3.00 | 39 | 2.17 | 10 |
| 2.98 | 56 | 2.15 | 14 |
| 2.95 | 10 | 2.13 | 21 |
| 2.72 | 13 | | |

EXAMPLE III $Ba_2MgP_4O_{13}:Eu^{2+}$

|  | Mole ratio | Grams |
|---|---|---|
| $BaHPO_4$ | 1.94 | 31.6 |
| $3MgCO_3 \cdot Mg(OH)_2 \cdot 3H_2O$ | 0.25 | 6.4 |
| $(NH_4)_2HPO_4$ | 2.06 | 19.1 |
| $Eu_2O_3$ | 0.02 | 0.74 |

The process was the same as that of Examples 1 and 2 with the exception that the second firing was at 900° C. for 3 hours. The X-ray diffraction pattern was as follows:

| d | I/I₁ | d | I/I₁ |
|---|---|---|---|
| 8.42 | 16 | 2.64 | 13 |
| 7.08 | 5 | 2.54 | 25 |
| 5.57 | 17 | 2.50 | 16 |
| 4.94 | 25 | 2.44 | 16 |
| 4.79 | 19 | 2.38 | 30 |
| 4.04 | 18 | 2.31 | 21 |
| 3.98 | 8 | 2.24 | 22 |
| 3.59 | 100 | 2.18 | 14 |
| 3.35 | 56 | 2.16 | 17 |
| 3.21 | 95 | 2.12 | 29 |
| 3.07 | 13 | 2.05 | 34 |
| 2.89 | 11 | 2.03 | 14 |
| 2.81 | 76 | 1.97 | 16 |
| 2.74 | 8 | 1.94 | 17 |
| 2.69 | 20 | | |

EXAMPLE IV $BaMgP_2O_7:Eu^{2+}$

|  | Mole ratio | Grams |
|---|---|---|
| $BaHPO_4$ | 0.96 | 22.4 |
| $BaHPO_4$ | 0.96 | 22.4 |
| $3MgCO_3 \cdot Mg(OH)_2 \cdot 3H_2O$ | 0.25 | 9.12 |
| $(NH_4)_2HPO_4$ | 1.04 | 13.8 |
| $Eu_2O_3$ | 0.02 | 0.704 |

The process was the same as that of Examples 1 and 2 with the exception that the second firing was at 1050° C. The X-ray diffraction pattern was as follows:

| d | I/I₁ | d | I/I₁ |
|---|---|---|---|
| 7.07 | 14 | 3.08 | 30 |
| 6.32 | 35 | 2.99 | 40 |
| 5.07 | 22 | 2.96 | 45 |
| 4.05 | 16 | 2.79 | 14 |
| 3.75 | 13 | 2.74 | 32 |
| 3.69 | 15 | 2.63 | 22 |
| 3.53 | 8 | 2.60 | 8 |
| 3.37 | 69 | 2.57 | 8 |
| 3.30 | 14 | 2.27 | 17 |
| 3.24 | 5 | 2.13 | 16 |
| 3.14 | 16 | 2.04 | 20 |

EXAMPLE V $BaMgP_2O_7:Eu^{2+}, Mn^{2+}$

|  | Mole ratio | Grams |
|---|---|---|
| $BaHPO_4$ | 0.9 | 14.7 |
| $3MgCO_3 \cdot Mg(OH)_2 \cdot 3H_2O$ | 0.225 | 5.8 |
| $(NH_4)_2HPO_4$ | 1.1 | 10.2 |
| $Eu_2O_3$ | 0.03 | 0.74 |
| $MnCO_3$ | 0.08 | 0.64 |

The raw materials were dry mixed in a mixer mill for 20 minutes to produce a lump-free uniform blend. The blend was fired for 3 hours at 500° C. in a nitrogen atmosphere having a flow rate of 2 cubic feet per hour. After cooling in the nitrogen atmosphere, the material was thoroughly ground into powder form. The powder was then fired for 2 hours at 1050° C. in a slightly reducing atmosphere of 1% $H_2$—99% $N_2$ flowing at 5 cubic feet per hour over the powder. To prevent re-oxidation of the $Eu^{2+}$ and $Mn^{2+}$ activators, the powder was cooled in the same reducing atmosphere.

It is apparent that modifications and changes can be made within the spirit and scope of the instant invention, but it is our intention however, only to be limited by the scope of the claims.

I claim:

1. A divalent europium activated $BaO \cdot MgO \cdot P_2O_5$ phosphor wherein the ratio of Ba atoms to Mg atoms is between 2:1 and 1:2, and the ratio of Ba plus Mg atoms to P atoms is between 3:2 and 3:4.

2. The phosphor of claim 1 wherein the europium concentration is between about 0.0004 and 0.4 mole percent.

3. The phosphor according to claim 1 wherein the formula is $Ba_2Mg(PO_4)_2:Eu^{2+}$.

4. The phosphor according to claim 1 wherein the formula is $BaMg_2(PO_4)_2:Eu^{2+}$.

5. The phosphor according to claim 1 wherein the formula is $Ba_2MgP_4O_{13}:Eu^{2+}$.

6. The phosphor according to claim 1 wherein the formula is $BaMgP_2O_7:Eu^{2+}$.

7. A $BaO \cdot MgO \cdot P_2O_5$ phosphor activated by divalent manganese and divalent europium wherein the ratio of Ba atoms to Mg atoms is between about 2:1 and 1:2 and the ratio of Ba plus Mg atoms to P atoms is between about 3:2 and 3:4.

8. The phosphor of claim 7 wherein the europium concentration is between about 0.0004 and 0.4 mole percent and the manganese concentration is between about 0.0004 and 2.0 mole percent.

9. The phosphor of claim 7 wherein the formula is $BaMgP_2O_7:Eu^{2+}, Mn^{2+}$.

References Cited

UNITED STATES PATENTS

| | | | |
|---|---|---|---|
| 2,427,728 | 9/1947 | Jenkins et al. | 252—301.4 |
| 3,198,742 | 8/1965 | Ropp | 252—301.4 |

OTHER REFERENCES

Nazarova, Cathodoluminescence of Europium Activated Strontium Phosphates, Bull. Acad. Sci. U.S.S.R., vol. 25, 1961, pp. 322–324.

TOBIAS E. LEVOW, Primary Examiner

R. D. EDMONDS, Assistant Examiner